(12) United States Patent
Fiorani et al.

(10) Patent No.: US 11,510,270 B2
(45) Date of Patent: Nov. 22, 2022

(54) METHODS, APPARATUS AND SYSTEMS RELATING TO UE INACTIVITY

(71) Applicant: Telefonaktiebolaget LM Ericsson (publ), Stockholm (SE)

(72) Inventors: Matteo Fiorani, Solna (SE); Angelo Centonza, Stockholm (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 913 days.

(21) Appl. No.: 16/317,626

(22) PCT Filed: Oct. 9, 2018

(86) PCT No.: PCT/SE2018/051035
§ 371 (c)(1),
(2) Date: Jan. 14, 2019

(87) PCT Pub. No.: WO2019/098900
PCT Pub. Date: May 23, 2019

(65) Prior Publication Data
US 2021/0345440 A1 Nov. 4, 2021

Related U.S. Application Data

(60) Provisional application No. 62/587,723, filed on Nov. 17, 2017.

(51) Int. Cl.
*H04W 76/25* (2018.01)
*H04W 76/15* (2018.01)
*H04W 24/08* (2009.01)

(52) U.S. Cl.
CPC ........... *H04W 76/25* (2018.02); *H04W 24/08* (2013.01); *H04W 76/15* (2018.02)

(58) Field of Classification Search
CPC ..... H04W 76/25; H04W 76/15; H04W 24/08; H04W 36/0033; H04W 24/10;
(Continued)

(56) References Cited

U.S. PATENT DOCUMENTS 7,339,950 B2 3/2008 Nielsen et al.
2004/0240381 A1* 12/2004 Clark ................. H04L 41/0816
370/229
(Continued)

FOREIGN PATENT DOCUMENTS

CN 102802272 A 11/2012
KR 2016-0131077 A 11/2016
(Continued)

OTHER PUBLICATIONS

NTT DoCoMo, Inc., State Information Reporting over F1, 3GPP TSG RAN WG3 Meeting#97bis, Prague, Czech Republic, Oct. 9-13, 2017, from here on NTT. (Year: 2017).*
(Continued)

*Primary Examiner* — Ayaz R Sheikh
*Assistant Examiner* — Louis Samara
(74) *Attorney, Agent, or Firm* — Sage Patent Group

(57) ABSTRACT

Various methods, apparatus and systems are disclosed related to the detection and reporting of UE inactivity. One exemplary method is performed by a distributed unit of a base station. The base station further comprises a centralized unit. The method comprises: monitoring the activity of one or more data radio bearers, established between the distributed unit and a user equipment, for carrying user data; and transmitting, to the centralized unit, a report message comprising an indication of the activity of the one or more data radio bearers.

21 Claims, 15 Drawing Sheets

(58) Field of Classification Search
CPC . H04W 76/36; H04W 36/08; H04W 52/0216; H04W 28/04; H04W 72/08; H04W 28/0278; H04W 72/0446; H04W 76/38; H04W 76/50; H04L 5/0091; H04L 41/0816; H04B 7/0626

See application file for complete search history.

(56) References Cited

U.S. PATENT DOCUMENTS

| | | | |
|---|---|---|---|
| 2014/0126446 A1* | 5/2014 | Deivasigamani | H04W 52/0216 370/311 |
| 2015/0003361 A1 | 1/2015 | Palat et al. | |
| 2015/0098321 A1* | 4/2015 | Jeong | H04W 76/50 370/329 |
| 2015/0124718 A1* | 5/2015 | Molinero Fernandez | H04W 76/38 370/329 |
| 2015/0124748 A1* | 5/2015 | Park | H04W 76/15 370/329 |
| 2015/0312950 A1* | 10/2015 | Cartmell | H04W 76/38 370/329 |
| 2015/0327327 A1* | 11/2015 | Jain | H04W 76/36 370/328 |
| 2017/0164281 A1* | 6/2017 | Chiba | H04W 72/0446 |
| 2017/0273135 A1 | 9/2017 | Siomina et al. | |
| 2018/0279168 A1* | 9/2018 | Jheng | H04L 5/001 |
| 2018/0302813 A1 | 10/2018 | Hahn et al. | |
| 2019/0007996 A1* | 1/2019 | Boudreau | H04B 7/0626 |
| 2019/0059031 A1* | 2/2019 | Hahn | H04W 36/30 |
| 2019/0069333 A1* | 2/2019 | Kim | H04W 76/15 |
| 2020/0120735 A1* | 4/2020 | Wang | H04L 5/0098 |

FOREIGN PATENT DOCUMENTS

| | | |
|---|---|---|
| RU | 2573577 C1 | 1/2016 |
| WO | 2016189366 A1 | 12/2016 |
| WO | 2017061643 A1 | 4/2017 |

OTHER PUBLICATIONS

NTT DoCoMo, Inc., State Information Reporting over F1, R3-173880 3GPP TSG RAN WG3 Meeting#97bis, Prague, Czech Republic, Oct. 9-13, 2017, from here on NTT. (Year: 2017).*

Vodafone Group, "Inactivity Detection in Option 3 and 3X Architecture," 3GPP TSG-RAN WG3 97, R3-172673, Berlin, Germany, Aug. 21-25, 2017, 11 pages. (Year: 2017).*

Examination report No. 1 for Australian Patent Application No. 2018367818 dated Nov. 30, 2020, 8 pages.

NTT DoCoMo, Inc., "State information reporting over F1," R3-173880, 3GPP TSG RAN WG3 Meeting #97bis, Prague, Czech Republic, Oct. 9-13, 2017, 5 pages.

Notice of Preliminary Rejection for Korean Patent Application No. 10-2020-7013999 dated Dec. 7, 2020.

Decision on Grant and Search Report for Russian Patent Application No. 2020117197 (including English translation) dated Oct. 31, 2020, 22 pages.

Notice of Reasons for Rejection including English translation for Japanese Patent Application No. 2020-526076 dated Jun. 22, 2021, 8 pages.

Qualcomm Incorporated et al., "Architecture assumption for eV2X solutions," S2-174488, 3GPP TSG SA WG2 Meeting #122, Jun. 26-30, 2017, San Jose Del Cabo, Mexico.

Ericsson et al., "E1 interface functions," 3GPP TSG RAN WG3 Meeting #97b, Tdoc R3-173994, Prague, Czech Republic, Oct. 9-13, 2017, 3 pages.

Examination report for Indian Patent Application No. 201947003855 dated Apr. 6, 2021, 7 pages.

International Search Report and Written Opinion of the International Searching Authority for International Application No. PCT/SE2018/051035 dated Nov. 29, 2018.

3GPP TS 38.401 v0.4.1, "3$^{rd}$ Generation Partnership Project; Technical Specification Group Radio Access Network; NG-RAN; Architecture description (Release 15)," Oct. 2017, 25 pages.

3GPP TS 23.501 v1.5.0, "3$^{rd}$ Generation Partnership Project; Technical Specification Group Services and System Aspects; System Architecture for the 5G System; Stage 2 (Release 15)," Nov. 2017, 170 pages.

3GPP TS 38.473 v0.4.0, "3$^{rd}$ Generation Partnership Project; Technical Specification Group Radio Access Network; NG-RAN; F1 application protocol (F1AP) (Release 15)," Oct. 2017, 72 pages.

LG Electronics Inc., "Issues on RRC-INACTIVE state in CU-DU split," 3GPP TSG-RAN WG3 Meeting #97, R3-173198, Berlin, Germany, Aug. 21-25, 2017, 4 pages.

Vodafone Group, "Inactivity Detection in Option 3 and 3X Architecture," 3GPP TSG-RAN WG3 97, R3-172673, Berlin, Germany, Aug. 21-25, 2017, 11 pages.

Ericsson., "Further discussion on the internal split RAN architecture," 3GPP TSG-RAN WG3 NR AdHoc Meeting #2, R3-172513, Qingdao, P.R. China, Jun. 27-29, 2017, 6 pages.

3GPP TR 38.801 v14.0.0, "3$^{rd}$ Generation Partnership Project; Technical Specification Group Radio Access Network; Study on new radio access technology: Radio access architecture and interfaces (Release 14)," Mar. 2017, 91 pages.

* cited by examiner

1312
Receiving, from a first distributed unit,
a report message

Fig. 13

1410
Virtual Apparatus

1412
Receiving Unit

Fig. 14

1612
Monitor the activity of one or more radio bearers

Fig. 16

1710
Virtual Apparatus

1712
Monitoring Unit

Fig. 17

METHODS, APPARATUS AND SYSTEMS RELATING TO UE INACTIVITY

CROSS REFERENCE TO RELATED APPLICATIONS

This application is a 35 U.S.C. § 371 national stage application of PCT International Application No. PCT/SE2018/051035, filed on Oct. 9, 2018, which claims the benefit of U.S. Provisional Patent Application Serial No. 62/587,723, filed on Nov. 17, 2017, the disclosures and content of which are incorporated by reference herein in their entireties.

TECHNICAL FIELD

Embodiments of the disclosure relate to wireless communications networks, and particularly to methods, apparatus and systems for detecting and reporting UE inactivity in such networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The current 5G RAN (also known as Next Generation, or NG) architecture is shown in FIG. 1.

The NG architecture can be further described as follows:
The NG-RAN consists of a set of gNBs connected to the 5GC through the NG.
A gNB can support FDD mode, TDD mode or dual mode operation.
gNBs can be interconnected through the Xn.
A gNB may consist of a gNB-CU and one or more gNB-DUs.
A gNB-CU and a gNB-DU are connected via F1 logical interface.
One gNB-DU is connected to only one gNB-CU.
NG, Xn and F1 are logical interfaces. For NG-RAN, the NG and Xn-C interfaces for a gNB consisting of a gNB-CU and one or more gNB-DUs terminate in the gNB-CU. For EN-DC, the S1-U and X2-C interfaces for a gNB consisting of a gNB-CU and gNB-DUs terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signalling transport. In NG-Flex configuration, each gNB is connected to all AMFs within an AMF Region. The AMF Region is defined in 3GPP TS 23.501, v 1.5.0.

The general principles for the specification of the F1 interface are as follows:
the F1 interface is be open;
the F1 interface supports the exchange of signalling information between the endpoints, in addition the interface shall support data transmission to the respective endpoints;
from a logical standpoint, the F1 is a point-to-point interface between the endpoints (a point-to-point logical interface should be feasible even in the absence of a physical direct connection between the endpoints);
the F1 interface supports control plane and user plane separation;
the F1 interface separates Radio Network Layer and Transport Network Layer;
the F1 interface enable exchanges of UE associated information and non-UE associated information;
the F1 interface is defined to be future proof to fulfil different new requirements, support new services and new functions;
one gNB-CU and a set of one or more gNB-DUs are visible to other logical nodes as a gNB. The gNB terminates X2, Xn, NG and S1-U interfaces;
the CU may be separated in control plane (CP) and user plane (UP).

There currently exist certain challenge(s). For example, in the 4G System (EPS), the eNB constantly monitors the UE activity on a per-bearer basis. The eNB determines when a bearer has been inactive for a given amount of time, and then takes action accordingly. For example, the eNB could decide to remove a bearer that has been inactive for a given amount of time. If all the bearers of a UE have been inactive for a given amount of time, the node controlling the UE's RRC state may decide to:
either change the UE state to RRC_IDLE, removing all UE specific resources in the RAN,
or, in LTE, suspend the UE connection, keeping a UE context in the RAN.

In the 5G System (5GS), a similar functionality is needed where, based on information of inactivity, an inactive data radio bearer could be removed, or, if all the DRBs of a UE have been inactive for a given amount of time, the node controlling the UE's RRC state can decide to
either change the UE state to RRC_IDLE, removing all UE specific control and user plane related resources from the RAN,
or send the UE to RRC_INACTIVE, while keeping necessary user and control plane related resources established in the RAN (e.g. stored in the gNB or another RAN node).

Note that, at a later point in time, RRC_INACTIVE equivalent function might be introduced into EPS as well.

SUMMARY

Certain aspects of the present disclosure and their embodiments may provide solutions to these or other challenges.

There are, proposed herein, various embodiments which address one or more of the issues disclosed herein.

In one aspect of the disclosure, there is provided a method in a distributed unit of a base station, which base station further comprises a centralized unit. The method comprises:

monitoring the activity of one or more data radio bearers, established between the distributed unit and a user equipment, for carrying user data; and transmitting, to the centralized unit, a report message comprising an indication of the activity of the one or more data radio bearers.

Apparatus configured to perform the method outlined above is also provided. For example, in one aspect, a distributed unit for a base station is provided. The base station further comprises a centralized unit. The distributed unit comprises processing circuitry and a non-transitory machine-readable medium storing instructions which, when executed by the processing circuitry, cause the distributed unit to: monitor the activity of one or more data radio bearers, established between the distributed unit and a user equipment, for carrying user data; and transmit, to the centralized unit, a report message comprising an indication of the activity of the one or more data radio bearers.

Another aspect of the disclosure provides a method in a centralized unit of a base station, which base station further comprises one or more distributed units. The method comprises: receiving, from a first distributed unit of the one or more distributed units, a report message comprising an indication of the activity of one or more first data radio bearers, established between the first distributed unit and a user equipment, for carrying user data.

Apparatus configured to perform the method outlined above is also provided. For example, in one aspect, a centralized unit for a base station is provided. The base station further comprises one or more distributed units. The centralized unit comprises processing circuitry and a non-transitory machine-readable medium storing instructions which, when executed by the processing circuitry, cause the centralized unit to: receive, from a first distributed unit of the one or more distributed units, a report message comprising an indication of the activity of one or more first data radio bearers, established between the first distributed unit and a user equipment, for carrying user data.

A further aspect of the disclosure provides a method in a centralized unit of a base station, which base station further comprises a distributed unit. One or more radio bearers are established between the base station and a user equipment for carrying user data.

The centralized unit implements a user plane entity and a control plane entity. The method comprises, in the user plane entity: monitoring the activity of the one or more radio bearers.

Apparatus configured to perform the method outlined above is also provided. For example, in one aspect, a centralized unit for a base station is provided. The base station further comprises a distributed unit. The centralized unit implements a user plane entity and a control plane entity. The centralized unit comprises processing circuitry and a non-transitory machine-readable medium storing instructions which, when executed by the processing circuitry, cause the centralized unit to, in the user plane entity: when one or more radio bearers are established between the base station and a user equipment for carrying user data, monitor the activity of the one or more radio bearers.

Certain embodiments may provide one or more of the following technical advantage(s). For example, the proposed embodiments may allow the gNB-DU to inform the gNB-CU about the UE activity (on a per-UE or per-bearer basis). The gNB-CU may use this information to e.g., remove unused bearers or change the UE state to RRC_IDLE or RRC_INACTIVE. This in turn allows the network to save radio resources and reduce UE energy consumption. Embodiments of the disclosure may further allow similar UE activity information to be exchanged between different RAN nodes e.g., between a Master Node and a Secondary Node in case of dual-connectivity and/or LTE-NR interworking.

The term "a radio bearer" or "a bearer" shall be understood herein to mean the set of resources used over the air to communicate with a specific UE via a single PDCP protocol instance. Such a radio bearer could consist of radio, or over-the-air resources served by different radio transmission points, e.g. different DUs and different DRBs. The term "data radio bearer", when used in the context of a DU-CU architecture, refers to the set of over the air resources used to communicate between a CU to a UE via a specific DU. Such a DRB in this disclosure is the end-to-end channel created between the CU, the DU and the UE in order to exchange either part or all the traffic corresponding to a radio bearer.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 13 is a flowchart of a method implemented in a centralized unit of a base station according to embodiments of the disclosure;

FIG. 14 is a schematic drawing of a virtualization apparatus according to embodiments of the disclosure;

FIG. 16 is a flowchart of a method implemented in a centralized unit of a base station according to embodiments of the disclosure;

FIG. 17 is a schematic drawing of a virtualization apparatus according to embodiments of the disclosure.

DETAILED DESCRIPTION

Figure 1:
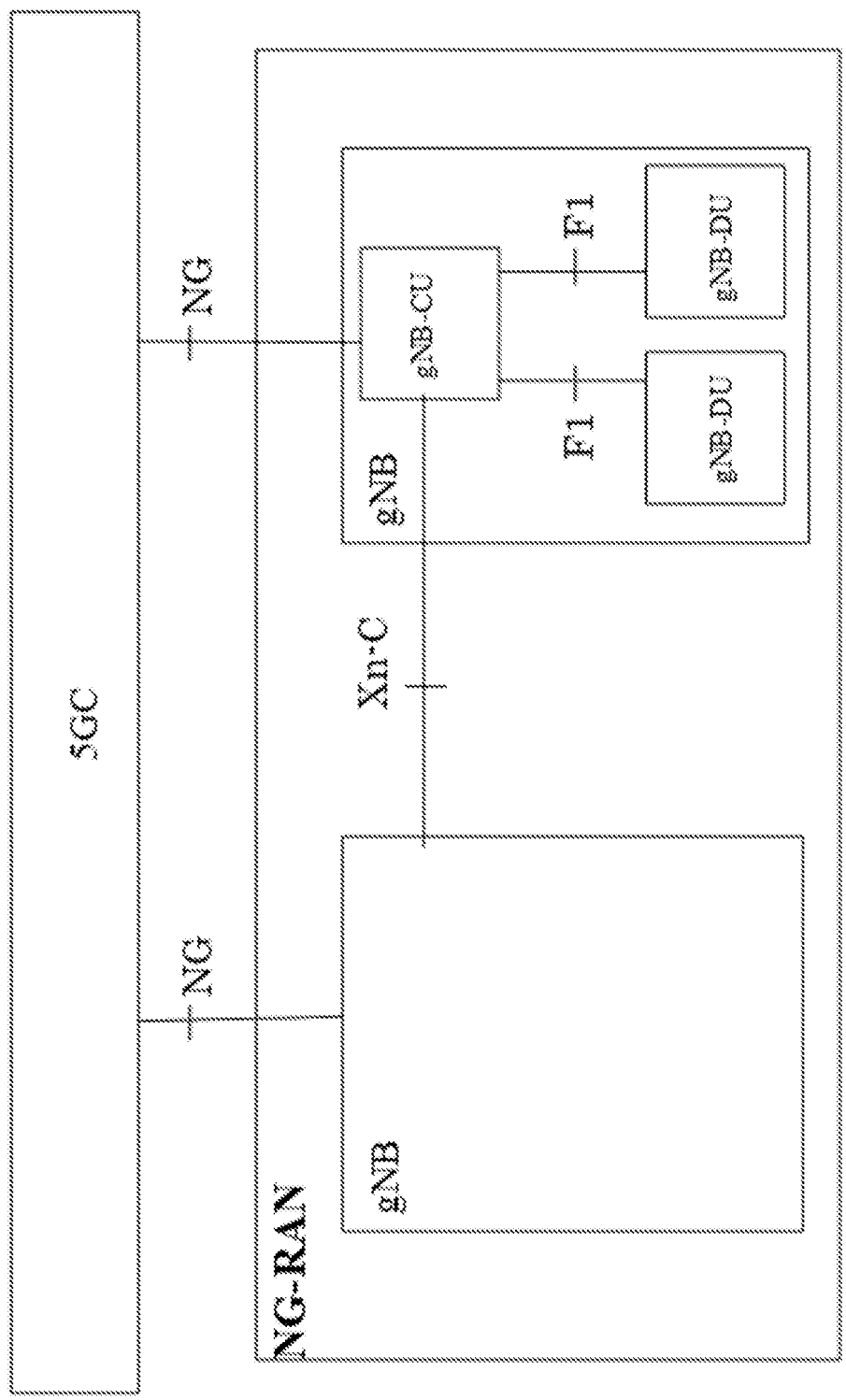
FIG. 1 shows the 5G RAN architecture as described in 3GPP TS38.401, version 0.4.1.

Where a RAN node is separated into a DU (distributed unit) and CU (centralized unit), one or more lower layers of the protocol stack reside in the DU, while one or more higher layers reside in the CU. Therefore, the DU may monitor the UE activity on a per-DRB basis and report to the CU either when a DRB or a UE (i.e., all the DRBs for the UE) have been inactive for a given amount of time. The CU can then take one or more actions based on the inactivity, such as removing unused DRBs or changing the UE state, or, if the CU is hosted in a Secondary RAN node (in case of dual connectivity), reporting to the Master RAN node that all user data bearers for which the secondary RAN node provide resources have been inactive for a given amount of time.

Note that separation of a RAN node into DUs and a CU is currently only implemented for gNBs, i.e. RAN nodes providing NR access only are separated into gNB-DUs and a gNB-CU. This may change at a later point in time, when separation into CU and DUs is also applied for RAN nodes providing E-UTRA or both NR access and E-UTRA, with a respective interface specified between the CU and DU, either based on F1 or a new interface, deployed in an EPS or 5GS. Accordingly embodiments described herein are applicable to all radio access technologies in which a base station or similar radio access network node can be implemented in a split architecture, with a first node (called the centralized node herein) providing functionality of one or more higher layers in the protocol stack, and one or more second nodes (called distributed nodes herein) providing functionality or one or more lower layers in the protocol stack. For example, the gNB-CU may host the RRC, SDAP and PDCP layers. The gNB-DU may host RLC, MAC and PHY layers.

It should be further noted that RAN resources for data radio bearers allocated for a UE can be provided by multiple DUs. A CU serving the UE may therefore receive inactivity indications from all connected DUs serving the same UE. Further, as mentioned above, in case of dual connectivity, more than one CU may be involved in serving a UE, one belonging logically to a Master RAN node, and one or more belonging logically to one or more Secondary RAN nodes. By receiving information from all DUs the CU connected to it can have a correct understanding of DRBs, or bearers or UE inactivity as far as the controlling CU is concerned. This is because a single bearer may be split between the CU and different DUs serving the UE (e.g. using different DRBs). Namely data traffic belonging to the same service (e.g., belonging to a QoS Flow) can be transmitted to the UE by means of two channels (e.g. DRBs): one over a first DU and another over a second DU. To understand whether the service is inactive a CU may need to receive inactivity indications from both the first and second DUs. Similarly, to understand if a UE is inactive the CU may need to have feedback from all the connected DUs that are serving the UE. In case of Dual Connectivity, the CU that logically belongs to the Master RAN node may host the function that finally decides the RRC State for the UE, hence making the final decision whether a UE shall be sent to RRC_INACTIVE (or to RRC_IDLE or be kept in RRC_CONNECTED).

Various solutions are disclosed for reporting UE activity information over the F1, the X2 and Xn interfaces. This allows the network to determine if a UE or a bearer or a DRB has been inactive for a given amount of time.

The disclosure provides at least two classes of solutions, one in which the CU (e.g. the user plane entity hosted by the CU) monitors UE and bearer/DRB inactivity, and another in which the DUs monitor bearer/DRB inactivity and send information to the CU.

For the case where the CU performs monitoring of bearers and UE's inactivity, monitoring may happen at UP level, e.g., at the PDCP instance used for UP traffic. Eventual information on inactivity may be passed to the CP functions of the CU responsible for UE state change or bearer setup/tear down, so that such functions can take appropriate decisions. In case that a standardized interface is utilized between the CP and UP functions, such as the E1 interface that is currently being studied in 3GPP, the inactivity information may be added to such an interface.

For the case of DU's signaling inactivity information to the CU two possible mechanisms for including UE activity information over the F1 interface are described as follows:

Introduce a new CP procedure in the F1AP specifications: This involves defining a new UE-associated and DU-initiated procedure. The procedure could be class 1 or class 2 (i.e. respectively, requiring a response to an initial message, or not requiring any response to an initial message). The DU may initiate the procedure by sending a message to the CU including information on whether the UE is active or inactive. For example, the DU may declare that the UE is inactive when all its bearers/DRBs have not been used for data transmission for a certain amount of time. The message may also include information about activity per-bearer/DRB. In case of a class 1 procedure, the gNB-CU may respond with an acknowledgment that the data has been received correctly.

Employ the F1AP UE Context Modification Required procedure: Another option is to rely on the existing F1AP UE Context Modification Required procedure, which is a UE-associated and gNB-DU initiated procedure as described in TS 38.473 (version 0.4.0). The UE Context Modification Required procedure is class 1. The DU may initiate the procedure by sending the UE Context Modification Required messages, and the CU may report the successful update of the UE Context in a UE Context Modification Confirm message. The UE Context Modification Required message could be enhanced with a new IE that carries information about UE activity and optionally also information about bearer/DRBs activity.

In both options above and in the case where the UE is served by multiple logical RAN nodes (such as cases of dual connectivity within NR across different gNBs or dual connectivity between LTE and NR or dual connectivity within LTE), information about inactivity may be signaled over interfaces between such RAN nodes. For example, this information may be signaled over the X2 (in case of EPS) or Xn interface (in case of 5GS). The information may be used to determine at the RAN node in control of UE RRC state changes whether a UE can be moved to e.g. Idle state or Inactive state or if the UE connection can be suspended (note that, according to the current status of 3GPP specification, "suspension of the UE connection" is presently applicable for EPS, while RRC_INACTIVE is presently applicable for 5GS, but this may change in future development of the specifications). Also, the information may also be provided to the node responsible for bearer/DRB management to decide whether to remove an inactive bearer/DRB or not.

Similarly as for the F1 interface, two possible solutions for sending inactivity indication over the X2 or Xn interface are:

- Introduce a new X2AP/XnAP procedure e.g., a new UE-associated and SN-initiated class 2 procedure. The SN uses this procedure to indicate the inactivity on per-UE and/or per-bearer basis to the MN.
- Employ an existing X2AP/XnAP procedure e.g., the "SN initiated SN modification" procedure and add a new IE that carries information about inactivity on a per-UE or per-bearer basis.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted above, embodiments of the disclosure may be classified into two groups: one in which a centralized unit of a base station monitors activity of a UE and/or one or more data radio bearers established with the UE; and one in which a distributed unit of a base station monitors activity of a UE and/or one or more data radio bearers established with the UE. In the following, we provide two example call-flows, or signalling diagrams, that illustrate embodiments falling in the latter category. Thus, the signalling diagrams may be used to provide information about the UE activity from a gNB-DU to gNB-CU over a suitable interface established between them (e.g. the F1 interface).

Example 1: UE Activity Information Provided Using a New Class 2 F1AP Procedure In this embodiment, shown in FIG. 2, a call-flow is presented that shows how the information about UE activity can be provided from gNB-DU 212, 214 to gNB-CU 216 using a new UE-associated, gNB-DU initiated, class 2 F1AP procedure.

Figure 2:
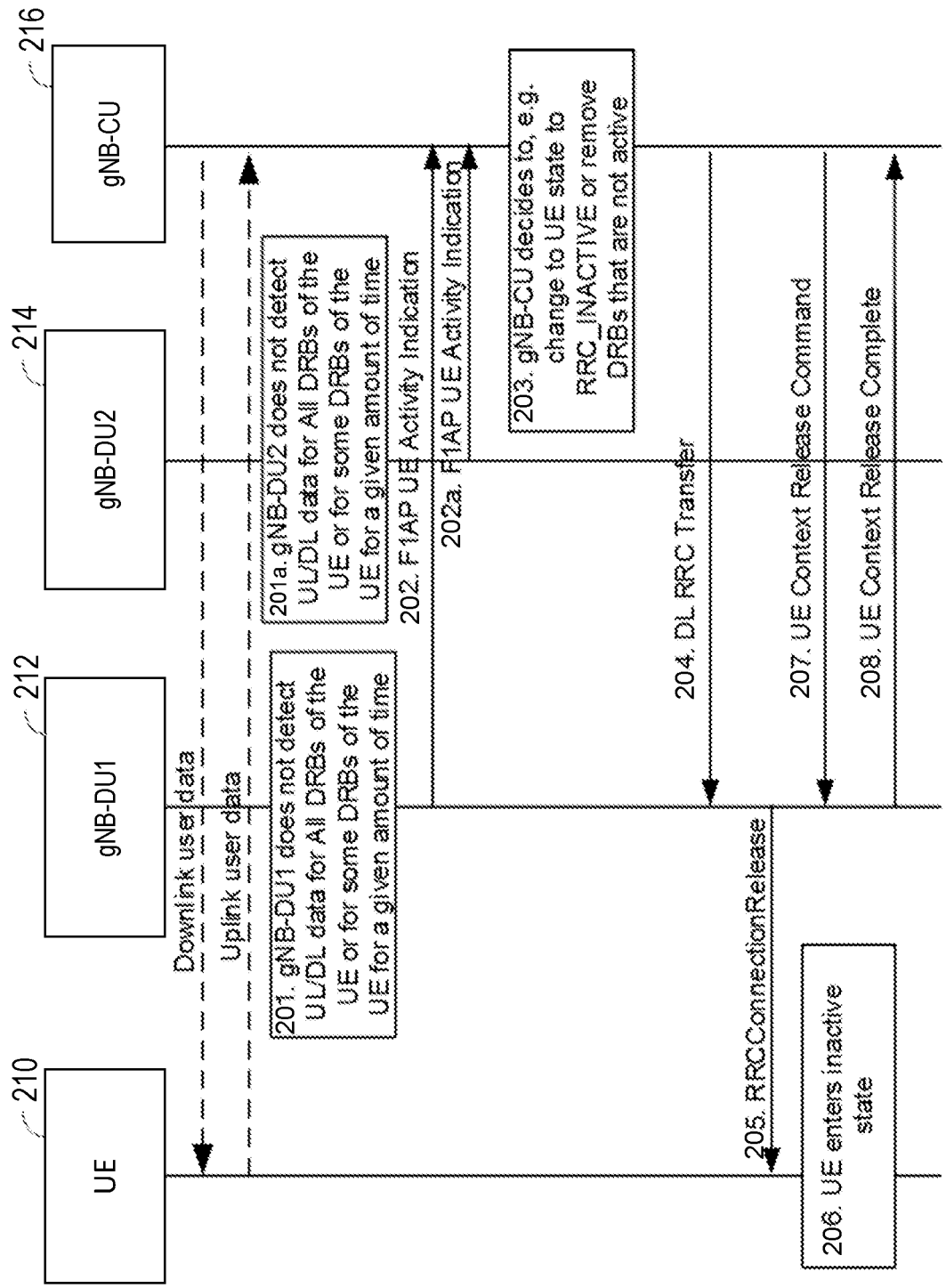
FIG. 2 is a signalling diagram relating to detection and reporting of UE/DRB activity according to embodiments of the disclosure.

The UE 210 is connected to the network and can transmit and receive data via a single or multiple DUs 212, 214 and/or via a single or multiple RAN nodes (FIG. 2 shows a single RAN node). One or more data radio bearers (DRBs) may be established between the UE and each DU for the transfer of user data. In addition, one or more signalling radio bearers (SRBs) may be established between the UE and at least one DU for the transfer of control data and signalling.

Step 201. The gNB-DU 212, 214 monitors UE activity (e.g. constantly, periodically, or on an ad hoc basis), and determines that the UE (i.e., all the DRBs of this UE) has not been transmitting or has not received data for a given amount of time, or has transmitted or received relatively little data for the given amount of time. In the former case, the gNB-DU may initiate or reset a timer upon the UE transmitting or receiving data, and determine that the UE is inactive upon the timer expiring without having been reset. In the latter case, for example, the DU may compare the amount of data transmitted or received within a rolling window to a threshold, and determine that the UE is inactive if that amount of data is below the threshold. Alternatively, the DU may determine that one or more DRBs have been inactive for a given amount of time. The embodiments recited above with respect to the determination that the UE is inactive apply equally to the determination that a particular DRB is inactive. In the example of FIG. 2, where DRBs are established between the UE and two gNB-DUs (gNB-DU1 and gNB-DU2), each gNB-DU monitors the activity of DRBs established between the respective DU and the UE.

Step 202. The gNB-DU sends, to the gNB-CU 216, a F1 PA UE Activity Indication message. The message may be transmitted over an interface between the two nodes, such as the F1 interface. The message may comprise an indication that the UE or certain DRBs have been determined as inactive (i.e. as in step 201 above). The message may thus comprise a single indication in respect of the UE, that all DRBs established between the gNB-DU and the UE have been determined as inactive. Alternatively, or additionally, the message may comprise respective indications for each of the DRBs established between the gNB-DU and the UE as to whether the particular DRB has been determined as inactive. The indications may be explicit or implicit. In the former case, separate indications may be provided for each DRB, as to whether the particular DRB is active or inactive. In the latter case, an indication may be provided by the presence or absence of a particular indication; for example, the message may comprise explicit indications for only those DRBs which have been determined as inactive (or conversely as active). The absence of an indication for a particular DRB from the message may be interpreted by the gNB-CU as the DRB being active (or conversely inactive). In the example of FIG. 2, both gNB-DUs determine that the UE (or one or more DRBs) has been inactive and transmit respective messages to the gNB-CU.

Step 203. With this information, the CU 216 may determine a level of inactivity of the UE, and take one or more actions based on that level of inactivity.

For example, the CU may determine that all bearers associated with the UE are inactive and therefore the UE as a whole is inactive. Alternatively, the CU may determine that the UE is not inactive as a whole, but that one or more DRBs are inactive. In the former case, the gNB-CU, if it hosts the function that determines the RRC state, may decide to change the UE state from its existing state (e.g., associated with relatively high power consumption and/or relatively high resource usage) to a new state (e.g. associated with lower power consumption and/or lower resource usage). For example, the UE may be changed from RRC_CONNECTED to a state such as RRC_INACTIVE or RRC_IDLE. In the latter case, if the gNB-CU hosts the function for DRB management (e.g. the PDCP entity), the gNB-CU may decide to remove (e.g. tear down) one or more DRBs configured for the UE (e.g. one or more, or all, of the DRBs indicated as inactive). If the gNB-CU does not host the function which decides RRC state, or manages DRBs, it may transmit an inactivity report message to the network node(s) hosting such functions. For example, in the case of dual connectivity, the gNB-CU, which may reside in a secondary gNB for the UE, may transmit the inactivity report message to the master gNB (e.g. over the X2 or Xn interface). This information enables the node controlling UE state changes and DRB management to either change the UE state or remove inactive DRBs (for example).

In the illustrated embodiment, the gNB-CU determines that the UE as a whole is inactive, and decides to change the state of the UE to RRC_INACTIVE:

Step 204. The gNB-CU 216 sends a DL RRC Transfer message to the gNB-DU that includes an RRCConnectionRelease message to be forwarded to the UE transparently.

Step 205. The gNB-DU 212 sends the RRCConnectionRelease message to the UE.

Step 206. The UE 210 enters RRC_INACTIVE state (i.e. a low-power state).

Step 207. The gNB-CU 216 sends an F1 AP UE Context Release Command to the gNB-DU.

Step 208. The gNB-DU 212 removes the UE Context, frees the corresponding resource, and responds with a UE Context Release Complete message.

For the case where bearers are removed due to inactivity, the gNB-CU 216 may send a UE Context Modification Request to the DUs for which DRBs need to be removed. Such message may comprise a list of DRBs to be removed. The CU may also send an RRC Reconfiguration message to the UE.

Thus in the embodiment described above with respect to FIG. 2, the transmission of an inactivity report (e.g. the F1 PA UE Activity Indication message) by the gNB-DU is event-triggered, e.g., upon detection of inactivity in one or more (or all) DRBs established with the gNB-DU. In alternative embodiments, the gNB-DU may be configured (e.g. by the gNB-CU) to report activity messages to the gNB-CU on a periodic basis, i.e. not event-triggered. In this case, the activity report message transmitted by the gNB-DU may comprise an indication of the UE or the DRBs which have been determined as inactive (i.e. as above), or an indication of the level of activity of the UE or the DRBs. In the latter case, the indication may comprise an indication of an amount of data transmitted or received by the UE (or the DRB) within a particular time window, e.g. a rolling time window. The gNB-CU may then determine whether the UE (or particular DRBs) are inactive, e.g., by comparing the indicated level of activity to a threshold, or resetting a timer upon each transmission or reception of data, and determining that the UE (or DRB) is inactive when the level of activity is below the threshold, or the timer expires.

Figure 3:
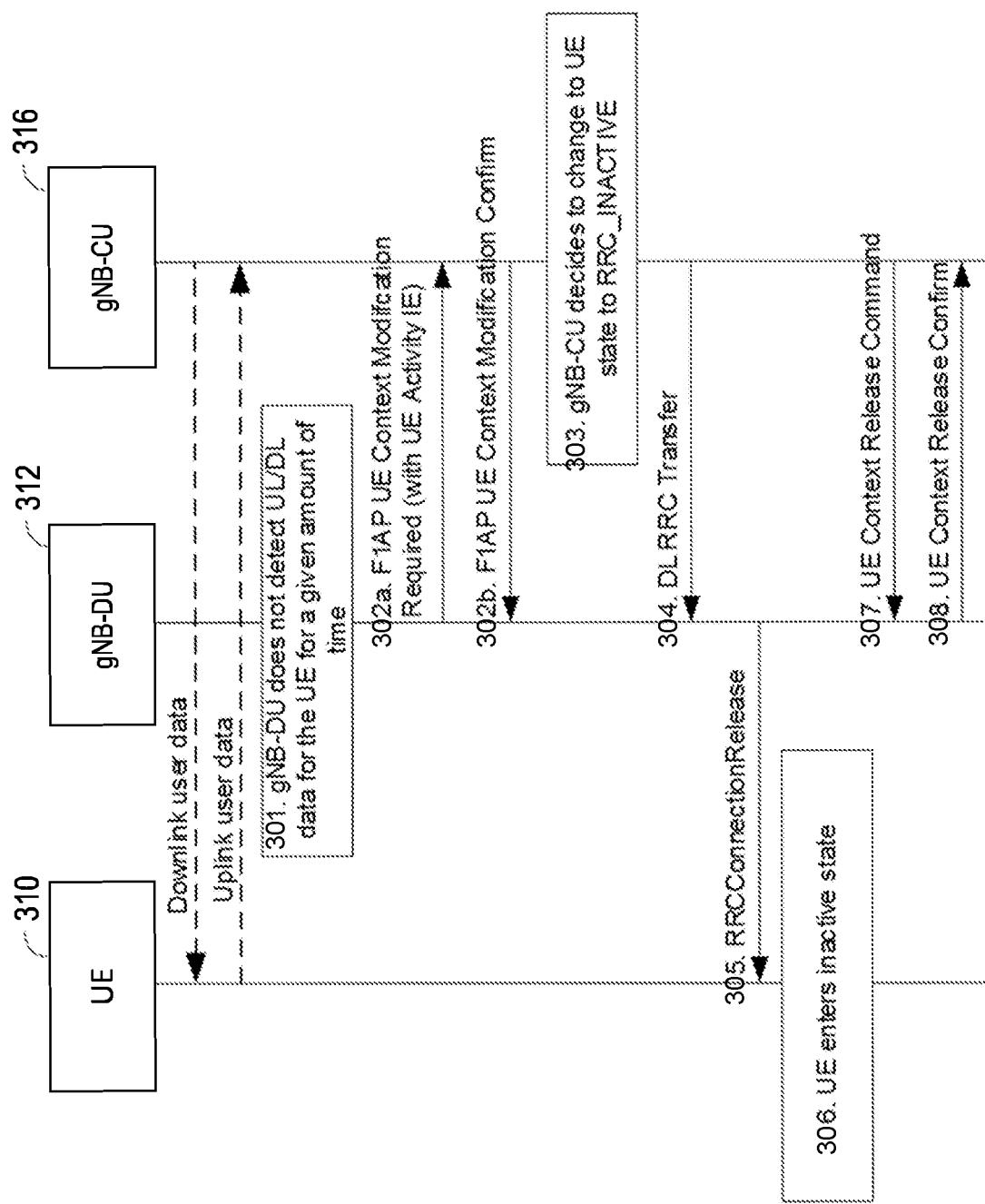
FIG. 3 is a signalling diagram relating to detection and reporting of UE/DRB activity according to further embodiments of the disclosure.

Example 2: UE Activity Information Provided Using a UE Context Modification Required In this embodiment, shown in FIG. 3, a call-flow is presented that shows how the information about UE activity can be provided from gNB-DU 312 to gNB-CU 316 using a F1AP UE-associated, gNB-DU initiated, class 1 F1AP UE Context Modification Required procedure in TS 38.473 (version 0.4.0).

The procedure is similar to that described above with respect to FIG. 2, but instead of a UE Activity Report procedure (in steps 202 and 202a), the UE Context Modification procedure is used with the addition of new IEs indicating per UE or per DRB inactivity in steps 302a and 302b). Thus, the inactivity report from the gNB-DU to the gNB-CU comprises a UE Context Modification message, having an indication (e.g. one or more IEs) of the level of activity of the UE 310 or the DRBs associated with the UE 310. Otherwise, steps 301, 303, 304, 305, 306, 307 and 308 are similar to their respective counterparts in FIG. 2.

As noted above, in a further category of embodiments, the CU performs monitoring of UE activity/inactivity.

As with the embodiments described above with respect to FIG. 2, the UE is connected to the network and can transmit and receive data via a single or multiple DUs and/or via a single or multiple RAN nodes. One or more DRBs may be established between the UE and each DU for the transfer of user data. In addition, one or more SRBs may be established between the UE and at least one DU for the transfer of control data and signalling.

The gNB-CU monitors UE activity (e.g. constantly, periodically, or on an ad hoc basis), and may determine that the UE (i.e., all the DRBs of this UE) has not been transmitting or has not received data for a given amount of time, or has transmitted or received relatively little data for the given amount of time. In the former case, the gNB-CU may initiate or reset a timer upon the UE transmitting or receiving data, and determine that the UE is inactive upon the timer expiring without having been reset. In the latter case, for example, the CU may compare the amount of data transmitted or received within a rolling window to a threshold, and determine that the UE is inactive if that amount of data is below the threshold. Alternatively, the CU may determine that one or more DRBs have been inactive for a given amount of time. The embodiments recited above with respect to the determination that the UE is inactive apply equally to the determination that a particular DRB is inactive.

The gNB-CU may comprise separate entities handling user plane (UP) functions and control plane (CP) functions. For example, the gNB-CU may comprise one or more CU-UP entities and one or more CU-CP entities. According to embodiments of the disclosure, the CU-UP entity may monitor the activity of the UE (or DRBs). Further, as noted above, the gNB-CU may implement one or more higher layers of a protocol stack.

In some embodiments of the disclosure, one of these layers (e.g. the PDCP layer) in the CU-UP entity may be used to monitor the activity of the UE or of one or more DRBs established.

The CU-UP may then send, to the CU-CP, a report message comprising an indication of the activity of the UE or one or more radio bearers of the UE. The message may be transmitted over an interface between the two nodes, such as the E1 interface. The message may comprise an indication that the UE or certain DRBs have been determined as inactive. The message may thus comprise a single indication in respect of the UE, that all DRBs established between the gNB and the UE have been determined as inactive. Alternatively, or additionally, the message may comprise respective indications for each of the DRBs established between the gNB and the UE as to whether the particular DRB has been determined as inactive. The indications may be explicit or implicit. In the former case, separate indications may be provided for each DRB, as to whether the particular DRB is active or inactive. In the latter case, an indication may be provided by the presence or absence of a particular indication; for example, the message may comprise explicit indications for only those bearers which have been determined as inactive (or conversely as active). The absence of an indication for a particular bearer from the message may be interpreted by the CU-CP as the bearer being active (or conversely inactive).

With this information, the CU-CP may take one or more actions based on the level of inactivity in the UE.

For example, the CU-CP may determine that all bearers associated with the UE are inactive and therefore the UE as a whole is inactive. In the former case, the CU-CP, if it hosts the function that determines the RRC state, may decide to change the UE state from its existing state (e.g., associated with relatively high power consumption and/or relatively high resource usage) to a new state (e.g. associated with lower power consumption and/or lower resource usage). For example, the UE may be changed from RRC_CONNECTED to a state such as RRC_INACTIVE or RRC_IDLE.

Alternatively or additionally, the CU-CP may determine that the UE is not inactive as a whole, but that one or more DRBs are inactive. In the latter case, if the CU-CP hosts the function for DRB management (e.g. the PDCP entity), the CU-CP may decide to remove (e.g. tear down) one or more DRBs configured for the UE (e.g. one or more, or all, of the DRBs indicated as inactive).

If the gNB-CU does not host the function which decides RRC state, or manages DRBs, it may transmit an inactivity report message to the network node(s) hosting such functions. For example, in the case of dual connectivity, the gNB-CU, which may reside in a secondary gNB for the UE, may transmit the inactivity report message to the master gNB (e.g. over the X2 or Xn interface). This information enables the node controlling UE state changes and DRB management to either change the UE state or remove inactive DRBs (for example).

Figure 4:
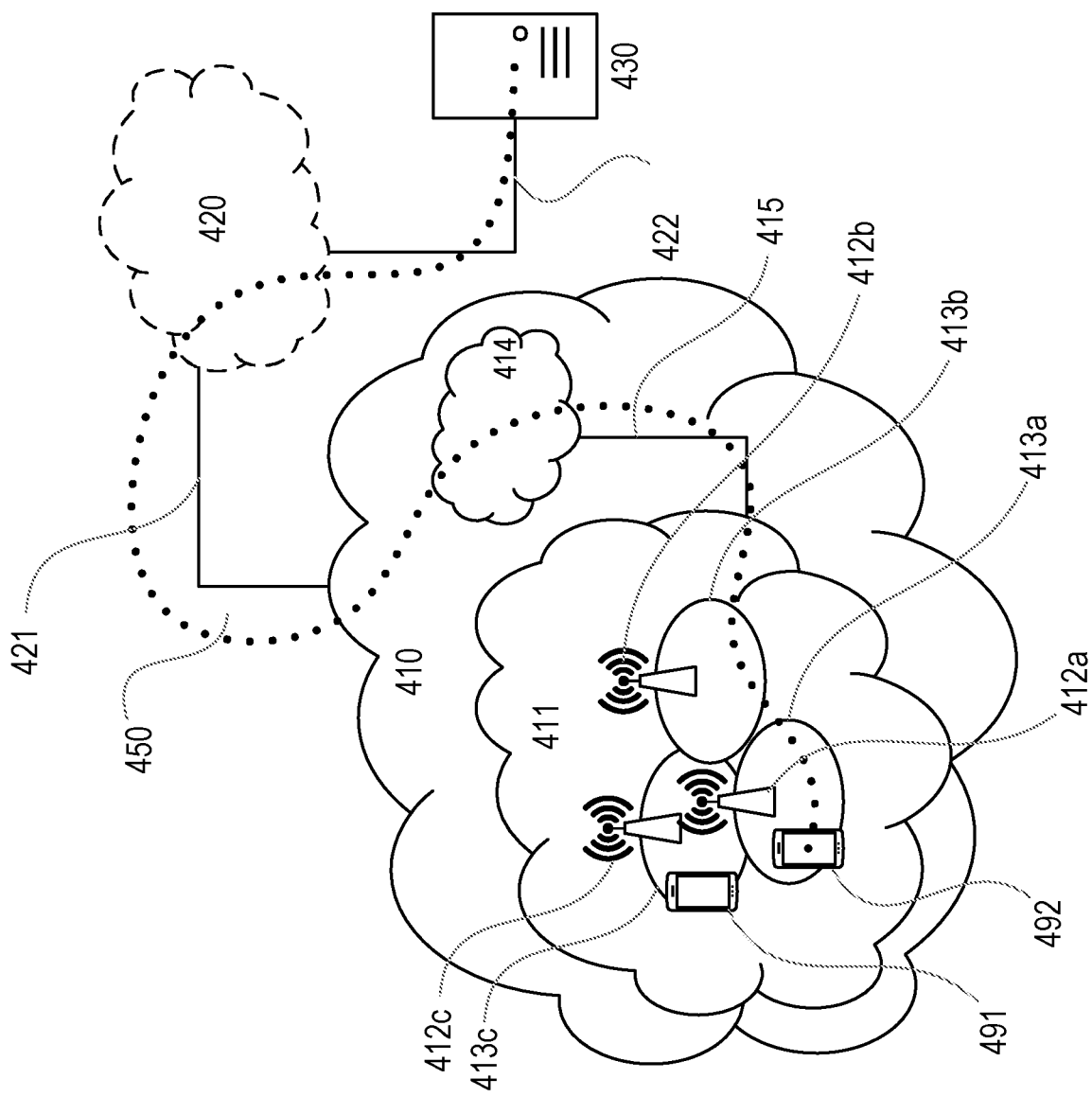
FIG. 4 shows a telecommunication network connected via an intermediate network to a host computer according to embodiments of the disclosure.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
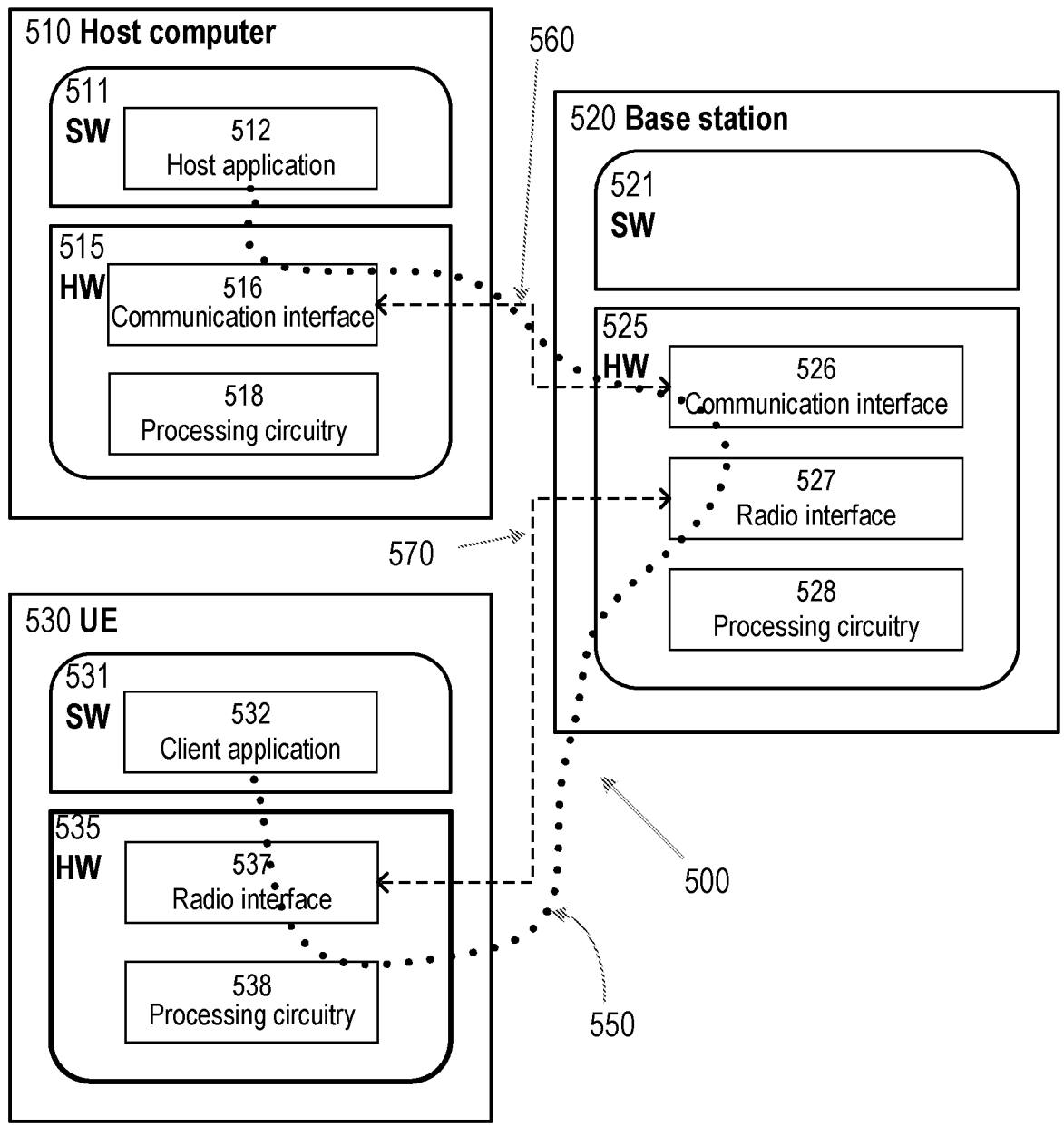
FIG. 5 shows a host computer communicating via a base station with a user equipment over a partially wireless connection in accordance with embodiments of the disclosure.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may free resources for allocation in the network and thereby provide benefits such as reduced user waiting time, better responsiveness and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
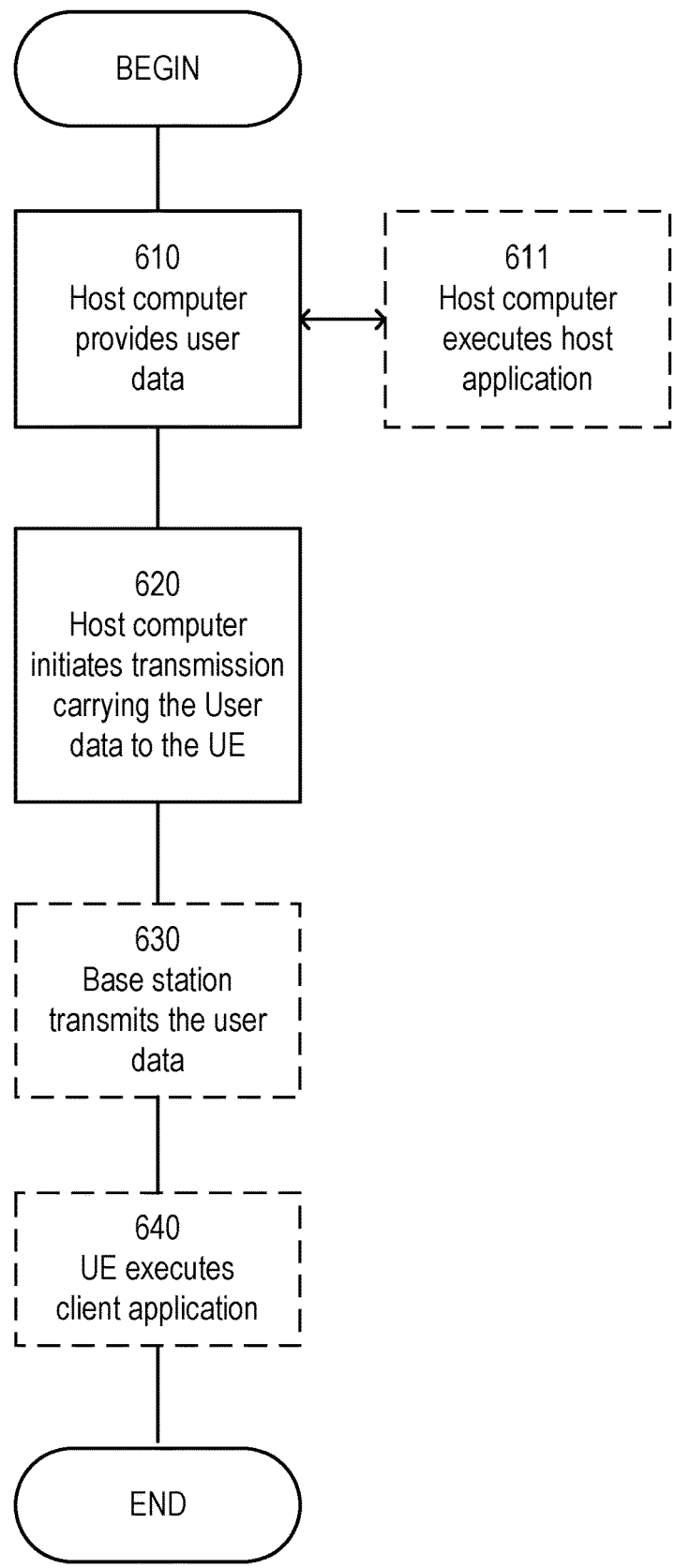
FIGS. 6 to 9 are flowchart of methods implemented in a communication system including a host computer, a base station and a user equipment according to embodiments of the disclosure.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
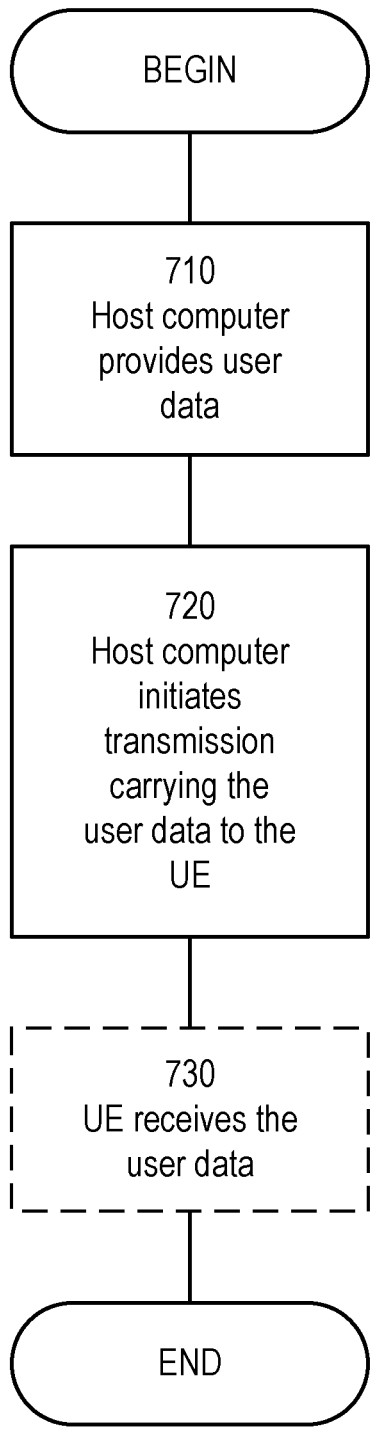

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
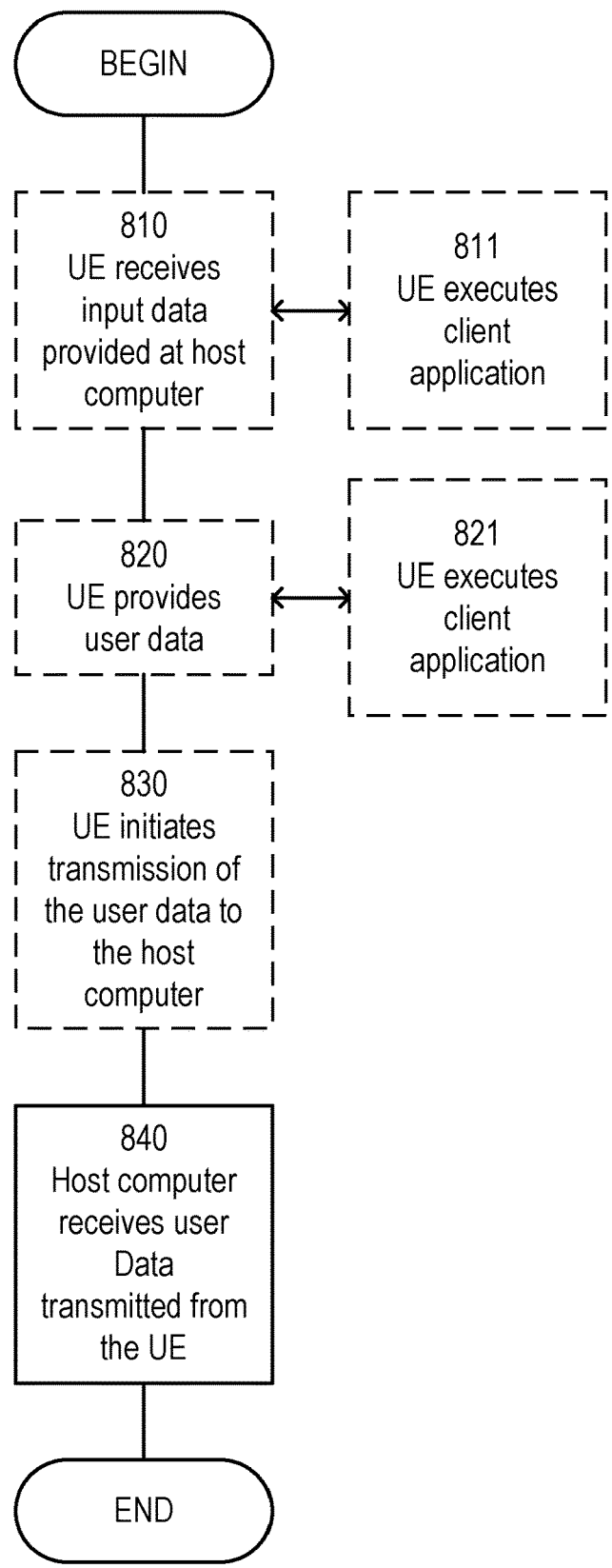

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
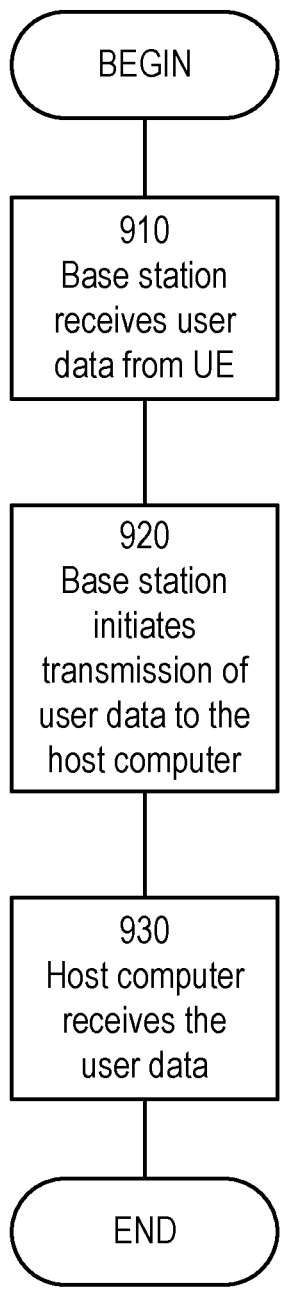

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 10:
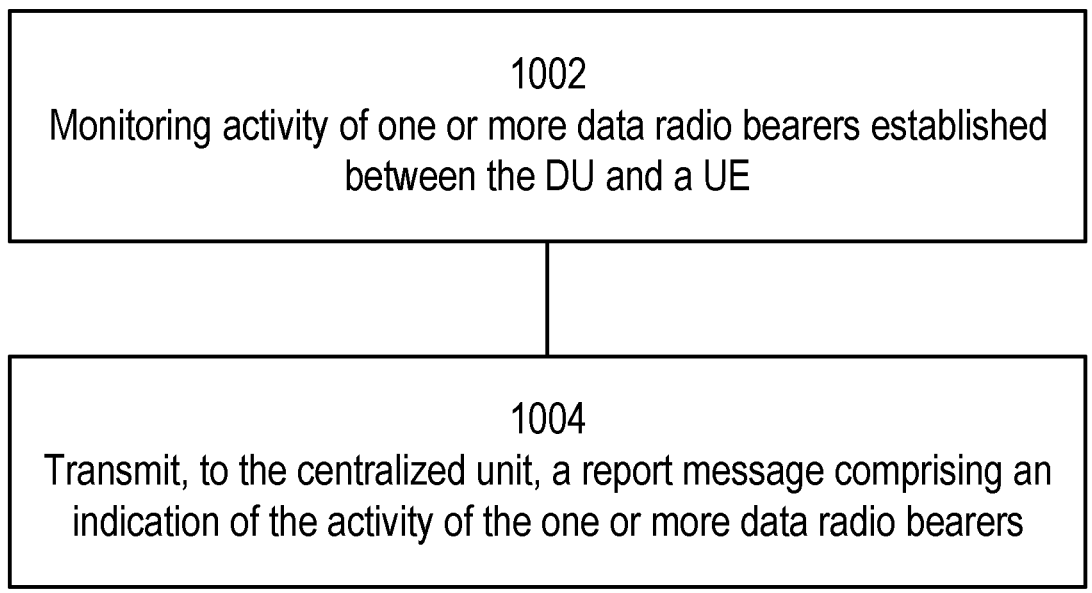
FIG. 10 is a flowchart of a method implemented in a distributed unit of a base station according to embodiments of the disclosure.

FIG. 10 depicts a method in accordance with particular embodiments. The method may be carried out in a distributed unit of a base station. The base station may further comprise a centralized unit. The method begins at step 1002 in which the distributed unit monitors the activity of one or more data radio bearers, established between the distributed unit and a user equipment, for carrying user data. In step 1004, the distributed unit transmits, to the centralized unit, a report message comprising an indication of the activity of the one or more data radio bearers.

Figure 11:
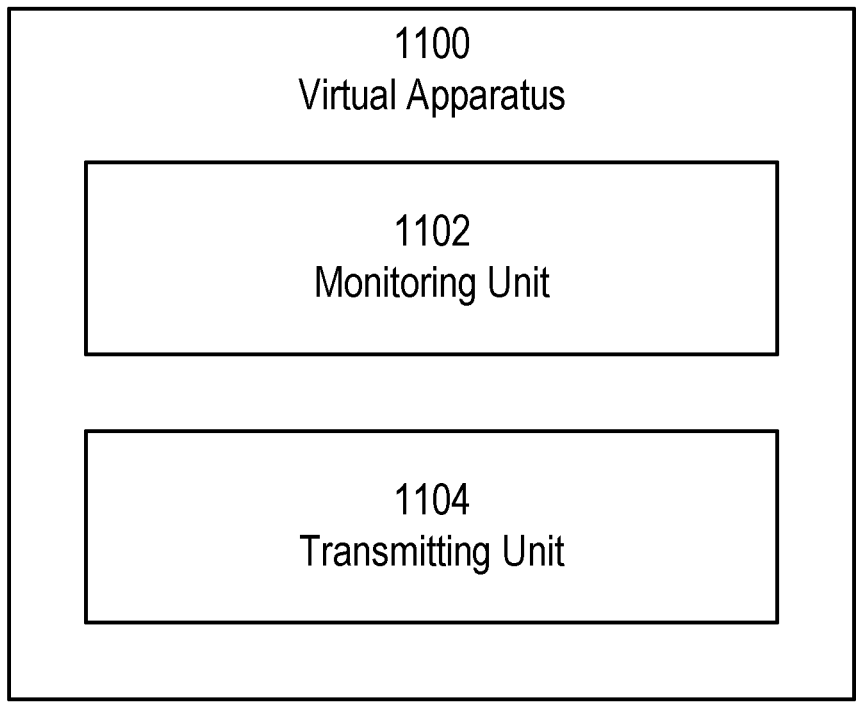
FIG. 11 is a schematic drawing of a virtualization apparatus according to embodiments of the disclosure.

FIG. 11 illustrates a schematic block diagram of an apparatus 1100 in a wireless network (for example, the wireless network shown in FIG. 1). The apparatus may be implemented in a distributed unit of a base station or network node (e.g., the gNB described above). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit 1102 and transmitting unit 1104, and any other suitable units of apparatus 1100 to perform corresponding functions according one or more embodiments of the present disclosure.

As illustrated in FIG. 11, apparatus WW00 includes monitoring unit 1102 and transmitting unit 1104. Monitoring unit 1102 is configured to monitor the activity of one or more data radio bearers, established between the distributed unit and a user equipment, for carrying user data. Transmitting unit 1104 is configured to transmit, to the centralized unit, a report message comprising an indication of the activity of the one or more data radio bearers.

Figure 12:
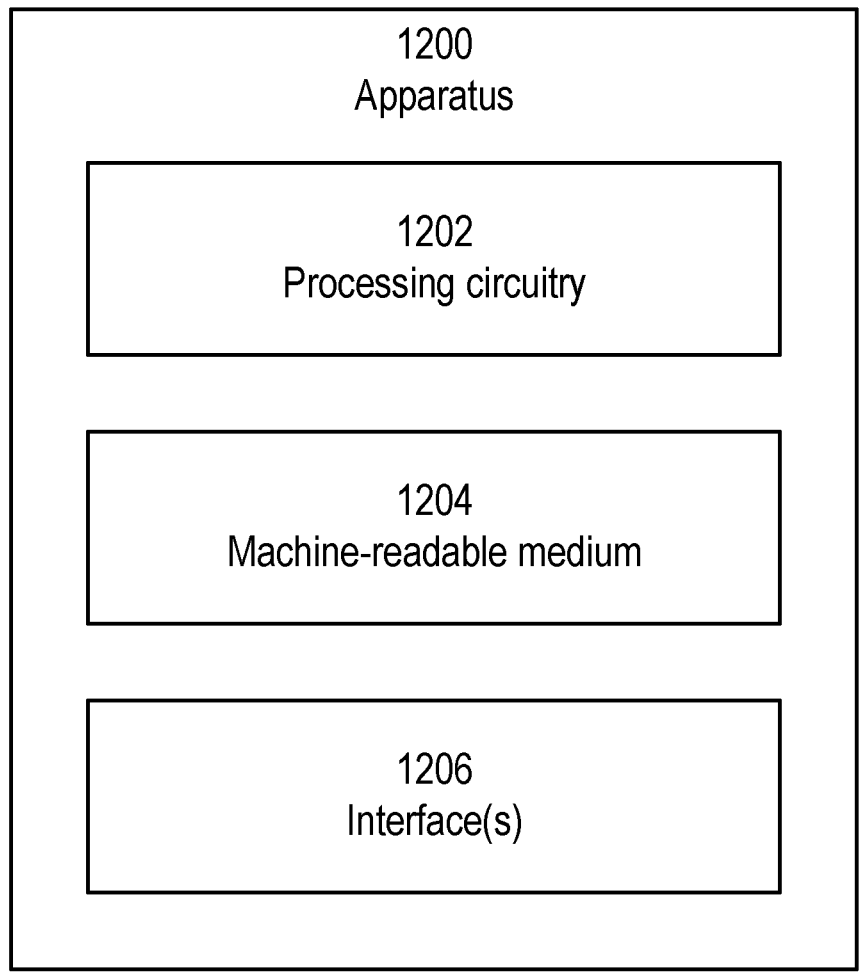
FIG. 12 is a schematic drawing of an apparatus implemented in a distributed unit of a base station according to embodiments of the disclosure.

FIG. 12 illustrates a schematic block diagram of an apparatus 1200 in a wireless network (for example, the wireless network shown in FIG. 1). The apparatus may be implemented in a distributed unit of a base station or network node (e.g., the gNB described above). Apparatus 1200 is operable to carry out the example method described with reference to FIG. 10 and possibly any other processes or methods disclosed herein. It is also to be understood that the method of FIG. 10 is not necessarily carried out solely by apparatus 1200. At least some operations of the method can be performed by one or more other entities.

Apparatus 1200 comprises processing circuitry 1202, a non-transitory machine-readable medium 1204, and one or more interfaces 1206. The processing circuitry 1200 may comprise one or more microprocessor or microcontrollers, as well as other digital hardware, which may include digital signal processors (DSPs), special-purpose digital logic, and the like. The machine-readable medium 1204 may comprise memory, which may include one or several types of memory such as read-only memory (ROM), random-access memory, cache memory, flash memory devices, optical storage devices, etc. The machine-readable medium stores instructions which, when executed by the processing circuitry 1202, cause the apparatus 1200 to monitor the activity of one or more data radio bearers, established between the distributed unit and a user equipment, for carrying user data; and transmit, to the centralized unit, a report message comprising an indication of the activity of the one or more data radio bearers.

FIG. 13 depicts a method in accordance with particular embodiments. The method may be carried out in a centralized unit of a base station. The base station may further comprise a distributed unit. The method begins at step 1312 in which the centralized unit receives, from a first distributed unit of the one or more distributed units, a report message comprising an indication of the activity of one or more first data radio bearers, established between the first distributed unit and a user equipment, for carrying user data.

FIG. 14 illustrates a schematic block diagram of an apparatus 1410 in a wireless network (for example, the wireless network shown in FIG. 1). The apparatus may be implemented in a centralized unit of a base station or network node (e.g., the gNB described above). Apparatus 1410 is operable to carry out the example method described with reference to FIG. 13 and possibly any other processes or methods disclosed herein. It is also to be understood that the method of FIG. 13 is not necessarily carried out solely by apparatus 1410. At least some operations of the method can be performed by one or more other entities.

Virtual Apparatus 1410 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1412, and any other suitable units of apparatus 1410 to perform corresponding functions according to one or more embodiments of the present disclosure.

As illustrated in FIG. 14, apparatus 1410 includes receiving unit 1412.

Receiving unit 1412 is configured to receive, from a first distributed unit of the one or more distributed units, a report message comprising an indication of the activity of one or more first data radio bearers, established between the first distributed unit and a user equipment, for carrying user data.

Figure 15:
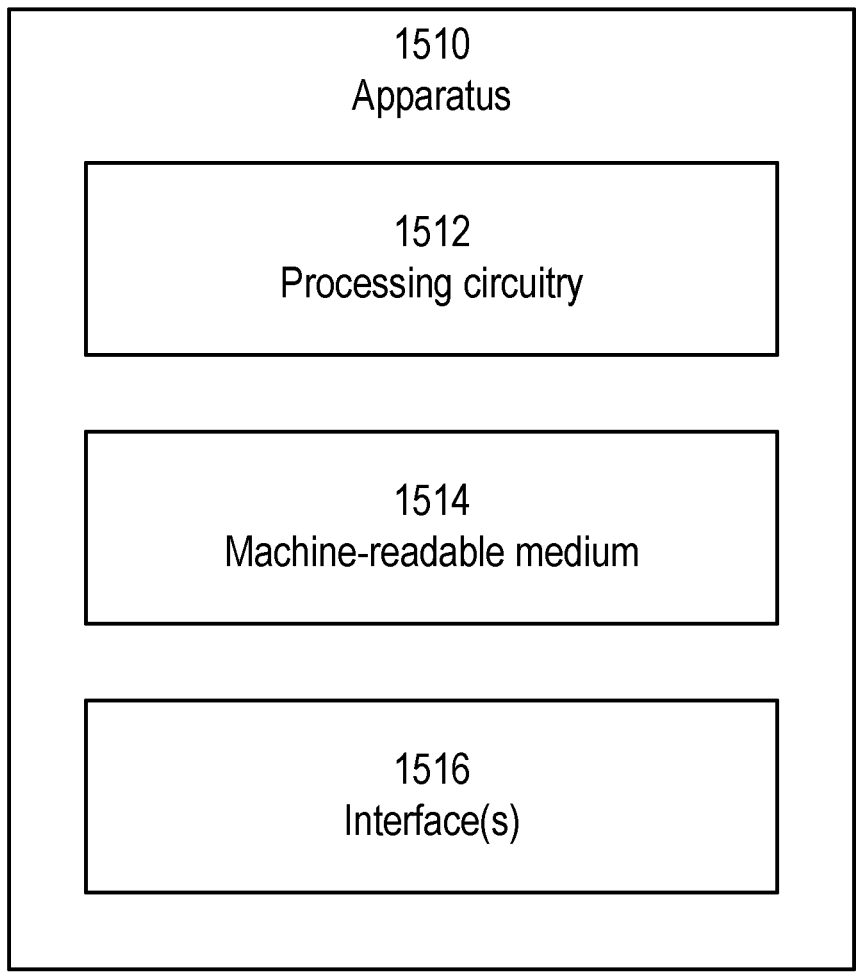
FIG. 15 is a schematic drawing of an apparatus implemented in a centralized unit of a base station according to embodiments of the disclosure.

FIG. 15 illustrates a schematic block diagram of an apparatus 1510 in a wireless network (for example, the wireless network shown in FIG. 1). The apparatus may be implemented in a centralized unit of a base station or network node (e.g., the gNB described above). Apparatus 1510 is operable to carry out the example method described with reference to FIG. 13 and possibly any other processes or methods disclosed herein. It is also to be understood that the method of FIG. 13 is not necessarily carried out solely by apparatus 1510. At least some operations of the method can be performed by one or more other entities.

Apparatus 1510 comprises processing circuitry 1512, a non-transitory machine-readable medium 1514, and one or more interfaces 1516. The processing circuitry 1510 may comprise one or more microprocessor or microcontrollers, as well as other digital hardware, which may include digital signal processors (DSPs), special-purpose digital logic, and the like. The machine-readable medium 1514 may comprise memory, which may include one or several types of memory such as read-only memory (ROM), random-access memory, cache memory, flash memory devices, optical storage devices, etc. The machine-readable medium stores instructions which, when executed by the processing circuitry 1512, cause the apparatus 1510 to receive, from a first distributed unit of the one or more distributed units, a report message comprising an indication of the activity of one or more first data radio bearers, established between the first distributed unit and a user equipment, for carrying user data.

FIG. 16 depicts a method in accordance with particular embodiments. The method may be carried out in a centralized unit of a base station. The base station may further comprise a distributed unit. One or more radio bearers are established between the base station and a user equipment for carrying user data. The centralized unit implements a user plane entity and a control plane entity.

The method begins at step 1612 in which the user plane entity monitors the activity of the one or more radio bearers.

FIG. 17 illustrates a schematic block diagram of an apparatus 1710 in a wireless network (for example, the wireless network shown in FIG. 1). The apparatus may be implemented in a centralized unit of a base station or network node (e.g., the gNB described above). Apparatus 1710 is operable to carry out the example method described with reference to FIG. 16 and possibly any other processes or methods disclosed herein. It is also to be understood that the method of FIG. 16 is not necessarily carried out solely by apparatus 1710. At least some operations of the method can be performed by one or more other entities.

Virtual Apparatus 1710 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit 1712, and any other suitable units of apparatus 1710 to perform corresponding functions according to one or more embodiments of the present disclosure.

As illustrated in FIG. 17, apparatus 1710 includes monitoring unit 1712. Monitoring unit 1712 is configured to monitor the activity of the one or more radio bearers.

Figure 18:
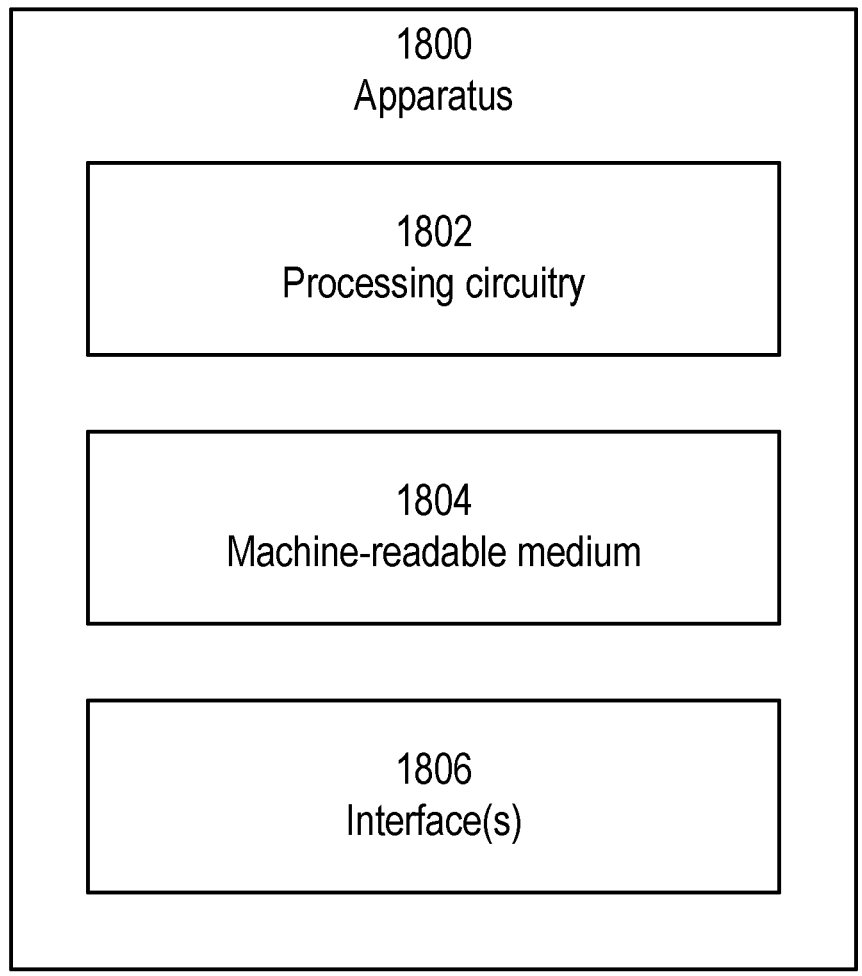
FIG. 18 is a schematic drawing of an apparatus implemented in a centralized unit of a base station according to embodiments of the disclosure.

FIG. 18 illustrates a schematic block diagram of an apparatus 1800 in a wireless network (for example, the wireless network shown in FIG. 1). The apparatus may be implemented in a centralized unit of a base station or network node (e.g., the gNB described above). Apparatus 1800 is operable to carry out the example method described with reference to FIG. 16 and possibly any other processes or methods disclosed herein. It is also to be understood that the method of FIG. 16 is not necessarily carried out solely by apparatus 1800. At least some operations of the method can be performed by one or more other entities.

Apparatus 1800 comprises processing circuitry 1802, a non-transitory machine-readable medium 1804, and one or more interfaces 1806. The processing circuitry 1802 may comprise one or more microprocessor or microcontrollers, as well as other digital hardware, which may include digital signal processors (DSPs), special-purpose digital logic, and the like. The machine-readable medium 1804 may comprise memory, which may include one or several types of memory such as read-only memory (ROM), random-access memory, cache memory, flash memory devices, optical storage devices, etc. The machine-readable medium stores instructions which, when executed by the processing circuitry 1802, cause the apparatus 1800 to monitor the activity of the one or more radio bearers.

The disclosure above has focused on the reporting of inactivity on the level of radio bearers and data radio bearers. Those skilled in the art will appreciate that inactivity may be reported at a different granular level without departing substantially from the scope of the description above and the embodiments set out below. For example, inactivity may be monitored and/or reported per QoS flow (which is a finer granularity than the data radio bearer). As with all of the embodiments set out above, the activity may be monitored in the DU and reported to the CU, or monitored in the CU. In either case, the CU may determine that a particular data radio bearer is inactive only when all the QoS flows associated with the data radio bearer have been indicated or determined as being inactive.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure:

Group A Embodiments

1. A method in a distributed unit of a base station, the base station further comprising a centralized unit, the method comprising:
monitoring the activity of one or more data radio bearers, established between the distributed unit and a user equipment, for carrying user data; and
transmitting, to the centralized unit, a report message comprising an indication of the activity of the one or more data radio bearers.

2. The method according to embodiment 1, wherein the indication of the activity of the one or more data radio bearers comprises an indication that at least one of the one or more data radio bearers is inactive.

3. The method according to embodiment 2, wherein the indication of the activity of the one or more data radio bearers comprises an indication that all of the one or more data radio bearers is inactive.

4. The method according to embodiment 1 or 2, wherein the indication of the activity of the one or more data radio bearers comprises respective indications for each of the one or more data radio bearers, as to whether the respective data radio bearer is inactive.

5. The method according to any one of the preceding embodiments, wherein the indication of the activity of the one or more data radio bearers is provided within an information element of the report message.

6. The method according to any one of the preceding embodiments, wherein the report message comprises a UE Context Modification Required message.

7. The method according to any one of the preceding embodiments, wherein the report message is transmitted over a F1 interface.

8. The method according to any one of the preceding embodiments, further comprising receiving a confirmation message from the centralized unit in respect of the report message.

9. The method according to embodiment 8, wherein the confirmation message comprises a UE Context Modification Confirm message.

10. The method according to any one of the preceding embodiments, wherein monitoring the activity of a particular data radio bearer comprises:
determining that no user data has been transmitted between the user equipment and the distributed unit over the particular data radio bearer for at least a threshold period of time.

11. A method in a centralized unit of a base station, the base station further comprising one or more distributed units, the method comprising:
receiving, from a first distributed unit of the one or more distributed units, a report message comprising an indication of the activity of one or more first data radio bearers, established between the first distributed unit and a user equipment, for carrying user data.

12. The method according to embodiment 11, wherein the indication of the activity of the one or more first data radio bearers comprises an indication that at least one of the one or more first data radio bearers is inactive.

13. The method according to embodiment 12, wherein the indication of the activity of the one or more first data radio bearers comprises an indication that all of the one or more first data radio bearers is inactive.

14. The method according to embodiment 11 or 12, wherein the indication of the activity of the one or more first data radio bearers comprises respective indications for each of the one or more first data radio bearers, as to whether the respective first data radio bearer is inactive.

15. The method according to any one of embodiments 11 to 14, wherein the indication of the activity of the one or more first data radio bearers is provided within an information element of the report message.

16. The method according to any one embodiments 11 to 15, wherein the report message comprises a UE Context Modification Required message.

17. The method according to any one of embodiments 11 to 16, wherein the report message is received over a F1 interface.

18. The method according to any one of embodiments 11 to 17, further comprising transmitting a confirmation message to the first distributed unit in respect of the report message.

19. The method according to embodiment 18, wherein the confirmation message comprises a UE Context Modification Confirm message.

20. The method according to any one of embodiments 11 to 19, further comprising:
responsive to a determination that a particular data radio bearer is inactive, removing the particular radio bearer.

21. The method according to any one of embodiments 11 to 20, further comprising:
responsive to a determination that all data radio bearers associated with the user equipment are inactive, initiating a procedure to alter the state of the user equipment.

22. The method according to any one of embodiments 11 to 21, further comprising:
receiving respective report messages from one or more second distributed units of the one or more distributed units, the respective report messages comprising respective indications of the activity of one or more second data radio bearers, established between the one or more second distributed units and the user equipment, for carrying user data.

23. The method according to embodiment 22, further comprising:
determining that the UE is inactive responsive to a determination that all data radio bearers associated with the user equipment, including the first and second radio bearers, are inactive.

24. The method according to any one of embodiments 11 to 23, further comprising: receiving a report message from a second base station providing dual connectivity services for the user equipment, the report message comprising an indication of the activity of one or more data radio bearers, established between the second base station and the user equipment, for carrying user data.

25. The method according to any one of embodiments 11 to 24, further comprising:
transmitting a report message to a second base station providing dual connectivity services for the user equipment, the report message comprising an indication of the activity of the one or more data radio bearers.

26. A method in a centralized unit of a base station, the base station further comprising a distributed unit, wherein one or more radio bearers are established between the base station and a user equipment for carrying user data, and wherein the centralized unit implements a user plane entity and a control plane entity, the method comprising, in the user plane entity:
monitoring the activity of the one or more radio bearers.

27. The method according to embodiment 25, further comprising, in the user plane entity, sending, to the control plane entity, a report message comprising an indication of the activity of the one or more radio bearers.

28. The method according to embodiment 25 or 26, further comprising, in the control plane entity:
responsive to a determination that a particular radio bearer is inactive, removing the particular radio bearer.

29. The method according to any one of embodiments 25 to 27, further comprising, in the control plane entity:
responsive to a determination that all radio bearers associated with the user equipment are inactive, initiating a procedure to alter the state of the user equipment.

30. The method according to embodiment 25 or 26, further comprising:
transmitting a report message to a second base station providing dual connectivity services for the user equipment, the report message comprising an indication of the activity of the one or more radio bearers.

31. The method according to any one of embodiments 25 to 29, wherein steps performed by the user plane entity are performed in a packet data convergence protocol, PDCP, layer of the user plane entity.

32. The method according to any one of embodiments 25 to 30, wherein the indication of the activity of the one or more radio bearers comprises an indication that at least one of the one or more radio bearers is inactive.

33. The method according to embodiment 31, wherein the indication of the activity of the one or more radio bearers comprises an indication that all of the one or more radio bearers is inactive.

34. The method according to any one of embodiments 25 to 30, wherein the indication of the activity of the one or more radio bearers comprises respective indications for each of the one or more radio bearers, as to whether the respective radio bearer is inactive.

35. The method according to any one of the preceding embodiments, wherein the centralized unit implements one or more of: a Radio Resource Control (RRC), a Service Data Adaptation Protocol (SDAP) and a Packet Data Convergence Protocol PDCP protocol.

36. The method according to any one of the preceding embodiments, wherein the distributed unit implements one or more of: a Radio Link Control (RLC) protocol, a Medium Access Control (MAC) protocol and the physical layer of the air interface.

Group B Embodiments

37. A base station comprising:
processing circuitry configured to perform any of the steps of any of the Group A embodiments;
power supply circuitry configured to supply power to the base station.

38. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A embodiments.

39. The communication system of the previous embodiment further including the base station.

40. The communication system of the previous 2 embodiments, further including the UE, wherein the UE is configured to communicate with the base station.

41. The communication system of the previous 3 embodiments, wherein:
the processing circuitry of the host computer is configured to execute a host application, thereby providing the user data; and
the UE comprises processing circuitry configured to execute a client application associated with the host application.

42. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A embodiments.

43. The method of the previous embodiment, further comprising, at the base station, transmitting the user data.

44. The method of the previous 2 embodiments, wherein the user data is provided at the host computer by executing a host application, the method further comprising, at the UE, executing a client application associated with the host application.

45. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.

46. The communication system of the previous embodiment further including the base station.

47. The communication system of the previous 2 embodiments, further including the UE, wherein the UE is configured to communicate with the base station.

48. The communication system of the previous 3 embodiments, wherein:
the processing circuitry of the host computer is configured to execute a host application;
the UE is configured to execute a client application associated with the host application, thereby providing the user data to be received by the host computer.

ABBREVIATIONS

At least some of the following abbreviations may be used in this disclosure.
5GC 5G Core Network
5GS 5G System
AMF Access and Mobility Management Function
CP Control Plane
CU Centralized Unit
CU-CP CU Control Plane
CU-UP CU User Plane
DL Downlink
DRB Data Radio Bearer
DU Distributed Unit
E1 Interface between a CU-UP and a CU-CP
EN-DC EUTRAN-NR Dual Connectivity
EPS Evolved Packet System
E-UTRA Evolved UTRA
E-UTRAN Evolved UTRAN
F1 Interface between a gNB-CU and gNB-DU
F1 AP F1 Application Protocol for the F1 interface part between the CU-CP part of gNB-CU and gNB-DU
FDD Frequency Division Duplex
eNB E-UTRAN NodeB or evolved NodeB. A RAN node (base station) supporting the LTE air interface for communication with UEs.
gNB A RAN node (base station) supporting the New Radio (NR) air interface for communication with UEs.
gNB-CU gNB Central Unit
gNB-DU gNB Distributed Unit
LTE Long Term Evolution
NG Interface between a gNB and the AMF
NG-Flex Function for flexible establishment of the NG interface between a gNB and an AMF
NG-RAN NG Radio Access Network
PDCP Packet Data Convergence Protocol
QoS Quality of Service
RAN Radio Access Network
RNL Radio Network Layer
RRC Radio Resource Control
SDAP Service Data Adaptation Protocol
TDD Time Division Duplex
TNL Transport Network Layer
TTI Transmission Time Interval
UE User Equipment
UL Uplink
UP User Plane
UMTS Universal Mobile Telecommunication System
UTRA UMTS Terrestrial Radio Access
UTRAN UMTS Terrestrial Radio Access Network
X2 Interface between an eNB and a gNB for the EN-DC scenario X2AP X2 Application Protocol for the X2 control plane interface between an eNB and a gNB or between two eNBs
X2-C X2 Control plane
interface between an eNB and the MME
S1-U S1 User plane interface between the eNB and the S-GW
S-GW Serving Gateway
Xn Interface between two gNBs or between an eNB and a gNB in non-EN-DC cases
XnAP Xn Application Protocol
Xn-C Xn Control Plane

The invention claimed is:

1. A method in a distributed unit of a base station, the base station further comprising a centralized unit, the method comprising:
monitoring an activity of one or more data radio bearers, established between the distributed unit and a user equipment, for carrying user data;
transmitting, to the centralized unit, a report message comprising an indication of the activity of the one or more data radio bearers; and
responsive to a determination that a particular data radio bearer among the one or more data radio bearers is inactive by determining that a level of the activity of the particular data radio bearer is below a threshold, removing the particular data radio bearer.

2. A method in a centralized unit of a base station, the base station further comprising one or more distributed units, the method comprising:
receiving, from a first distributed unit of the one or more distributed units, a report message comprising an indication of an activity of one or more first data radio bearers, established between the first distributed unit and a user equipment, for carrying user data; and
responsive to a determination that a particular data radio bearer among the one or more first data radio bearers is inactive by determining that a level of the activity of the particular data radio bearer is below a threshold, removing the particular data radio bearer.

3. A method in a centralized unit of a base station, the base station further comprising a distributed unit, wherein one or more radio bearers are established between the base station and a user equipment for carrying user data, and wherein the centralized unit implements a user plane entity and a control plane entity, the method comprising, in the user plane entity:
monitoring an activity of the one or more radio bearers; and
responsive to a determination that a particular data radio bearer among the one or more radio bearers is inactive by determining that a level of the activity of the particular data radio bearer is below a threshold, removing the particular data radio bearer.

4. A distributed unit for a base station, the base station further comprising a centralized unit, the distributed unit comprising:
processing circuitry and a non-transitory machine-readable medium storing instructions which, when executed by the processing circuitry, cause the distributed unit to:
monitor an activity of one or more data radio bearers, established between the distributed unit and a user equipment, for carrying user data;
transmit, to the centralized unit, a report message comprising an indication of the activity of the one or more data radio bearers; and
responsive to a determination that a particular data radio bearer among the one or more data radio bearers is inactive by determining that a level of the activity of the particular data radio bearer is below a threshold, remove the particular data radio bearer.

5. The distributed unit according to claim 4, wherein the indication of the activity of the one or more data radio bearers comprises respective indications for each of the one or more data radio bearers, as to whether the respective data radio bearer is inactive.

6. The distributed unit according to claim 4, wherein the report message is transmitted over a F1 interface.

7. The distributed unit according to claim 4, wherein the distributed unit is caused to monitor the activity of a particular data radio bearer by:
determining that no user data has been transmitted between the user equipment and the distributed unit over the particular data radio bearer for at least a threshold period of time.

8. A centralized unit for a base station, the base station further comprising one or more distributed units, the centralized unit comprising:
processing circuitry and a non-transitory machine-readable medium storing instructions which, when executed by the processing circuitry, cause the centralized unit to:
receive, from a first distributed unit of the one or more distributed units, a report message comprising an indication of an activity of one or more first data radio bearers, established between the first distributed unit and a user equipment, for carrying user data; and
responsive to a determination that a particular data radio bearer among the one or more first data radio bearers is inactive by determining that a level of the activity of the particular data radio bearer is below a threshold, remove the particular data radio bearer.

9. The centralized unit according to claim 8, wherein the indication of the activity of the one or more first data radio bearers comprises respective indications for each of the one or more first data radio bearers, as to whether the respective first data radio bearer is inactive.

10. The centralized unit according to claim 8, wherein the report message is received over a F1 interface.

11. The centralized unit according to claim 8, wherein the centralized unit is further caused to:
responsive to a determination that all data radio bearers associated with the user equipment are inactive, initiate a procedure to alter the state of the user equipment.

12. The centralized unit according to claim 8, wherein the centralized unit is further caused to:
receive respective report messages from one or more second distributed units of the one or more distributed units, the respective report messages comprising respective indications of the activity of one or more second data radio bearers, established between the one or more second distributed units and the user equipment, for carrying user data.

13. The centralized unit according to claim 12, wherein the centralized unit is further caused to:
determine that the user equipment is inactive responsive to a determination that all data radio bearers associated with the user equipment, including the first and second radio bearers, are inactive.

14. The centralized unit according to claim 8, wherein the centralized unit is further caused to:
receive a report message from a second base station providing dual connectivity services for the user equipment, the report message comprising an indication of the activity of one or more data radio bearers, established between the second base station and the user equipment, for carrying user data.

15. The centralized unit according to claim 8, wherein the centralized unit is further caused to:
   transmit a report message to a second base station providing dual connectivity services for the user equipment, the report message comprising an indication of the activity of the one or more data radio bearers.

16. A centralized unit for a base station, the base station further comprising a distributed unit, wherein the centralized unit implements a user plane entity and a control plane entity, the centralized unit comprising processing circuitry and a non-transitory machine-readable medium storing instructions which, when executed by the processing circuitry, cause the centralized unit to, in the user plane entity:
   when one or more radio bearers are established between the base station and a user equipment for carrying user data, monitor an activity of the one or more radio bearers,
   wherein the centralized unit is further caused to, in the control plane entity:
   responsive to a determination that a particular radio bearer among the one or more radio bearers is inactive by determining that a level of the activity of the particular data radio bearer is below a threshold, remove the particular radio bearer.

17. The centralized unit according to claim 16, wherein the centralized unit is further caused to, in the user plane entity, send, to the control plane entity, a report message comprising an indication of the activity of the one or more radio bearers.

18. The centralized unit according to claim 16, wherein the centralized unit is further caused to, in the control plane entity:
   responsive to a determination that all radio bearers associated with the user equipment are inactive, initiate a procedure to alter the state of the user equipment.

19. The centralized unit according to claim 16, wherein the centralized unit is further caused to:
   transmit a report message to a second base station providing dual connectivity services for the user equipment, the report message comprising an indication of the activity of the one or more radio bearers.

20. The centralized unit according to claim 16, wherein steps performed by the user plane entity are performed in a packet data convergence protocol, PDCP, layer of the user plane entity.

21. The centralized unit according to claim 16, wherein the indication of the activity of the one or more radio bearers comprises respective indications for each of the one or more radio bearers, as to whether the respective radio bearer is inactive.

* * * * *